(12) United States Patent
Monyak et al.

(10) Patent No.: US 8,708,008 B2
(45) Date of Patent: Apr. 29, 2014

(54) SHAPED CARBIDE TIPS, CARBIDE-TIPPED TEETH, AND TOOLS WITH SAME

(75) Inventors: Kenneth Monyak, Abingdon, VA (US);
James Paumier, Canton, OH (US);
Joseph Fader, Steiermark (AT)

(73) Assignee: Sandvik Intellectual Property AB, Sandviken (SE)

( * ) Notice: Subject to any disclaimer, the term of this patent is extended or adjusted under 35 U.S.C. 154(b) by 737 days.

(21) Appl. No.: 12/938,523

(22) Filed: Nov. 3, 2010

(65) Prior Publication Data

US 2012/0103471 A1 May 3, 2012

(51) Int. Cl.
*A01G 23/06* (2006.01)

(52) U.S. Cl.
USPC ........ 144/24.12; 144/230; 144/235; 241/294; 241/300; 407/115; 407/116

(58) Field of Classification Search
CPC ...... A01G 23/067; B27G 13/04; B23B 27/22; B02C 13/28; B02C 2/10; B02C 1/10
USPC ................. 144/235, 237, 240, 241, 218, 230, 144/24.12; 241/300, 294, 197; 407/113–116, 119, 30, 35, 40, 43, 47, 407/29
See application file for complete search history.

(56) References Cited

U.S. PATENT DOCUMENTS

| | | | |
|---|---|---|---|
| 2,780,856 A | 2/1957 | Traycoff | |
| 4,059,363 A | 11/1977 | Romagnolo | |
| 4,826,090 A * | 5/1989 | Orphall | 241/191 |
| 5,114,082 A * | 5/1992 | Brundiek | 241/121 |
| 5,240,192 A * | 8/1993 | Tilby et al. | 241/292.1 |
| 5,464,164 A * | 11/1995 | Doppstadt | 241/197 |
| 5,626,189 A * | 5/1997 | Hutchinson | 166/55.6 |
| 5,921,723 A * | 7/1999 | Satran et al. | 407/114 |
| 5,941,469 A | 8/1999 | Spiegemacher | |
| 6,213,931 B1 | 4/2001 | Twardowski et al. | |
| 6,227,772 B1 * | 5/2001 | Heinloth et al. | 407/113 |

(Continued)

FOREIGN PATENT DOCUMENTS

DE 930585 U1 7/1993
WO 2005/053850 6/2005

OTHER PUBLICATIONS

International Search Report for PCT/US2011/053578, dated Feb. 14, 2012.

*Primary Examiner* — Bena Miller
(74) *Attorney, Agent, or Firm* — Morgan, Lewis & Bockius LLP

(57) ABSTRACT

A carbide cutting tip including a rear surface and a bottom surface for mounting the tip to a cutting tool tooth, a top surface having a pair of peaks separated by a trough, the top surface including a frontward facet and a rearward facet sloped downwardly and rearwardly at a non-zero angle α with respect to the frontward facet, and a front surface having a substantially flat lower portion and a concave upper portion having a shape defined by a segment of an ellipse, the lower portion being disposed substantially perpendicularly to the frontward facet of the top surface, the lower portion and the upper portion joining at a break point located at the apex of the major axis of the ellipse, the major axis of the ellipse being canted frontwardly from the break point at a non-zero angle β with respect to the lower portion of the front surface.

26 Claims, 5 Drawing Sheets

(56) References Cited

U.S. PATENT DOCUMENTS

| | | |
|---|---|---|
| 6,290,436 B1 * | 9/2001 | Qvarth .................... 407/113 |
| 6,382,277 B1 | 5/2002 | Paumier et al. |
| 6,435,434 B1 | 8/2002 | Monyak |
| 6,546,977 B1 | 4/2003 | Monyak et al. |
| 7,000,859 B2 * | 2/2006 | Tuovinen .................... 241/294 |
| 7,137,583 B2 * | 11/2006 | Kammerer .................... 241/294 |
| 7,416,144 B2 | 8/2008 | Kammerer et al. |
| 8,439,608 B2 * | 5/2013 | Chen et al. .................... 407/11 |
| 2002/0102138 A1 * | 8/2002 | Iinuma .................... 407/42 |
| 2003/0145904 A1 | 8/2003 | Monyak et al. |
| 2006/0016304 A1 | 1/2006 | Monyak |
| 2006/0226270 A1 | 10/2006 | Kammerer et al. |
| 2007/0125445 A1 | 6/2007 | Watts |
| 2010/0003089 A1 | 1/2010 | Horiike et al. |

\* cited by examiner

SHAPED CARBIDE TIPS, CARBIDE-TIPPED TEETH, AND TOOLS WITH SAME

FIELD

The present disclosure relates to a tree stump grinding apparatus for disintegrating wood material, such as a tree stump grinder. More particularly, the present disclosure relates to carbide-tipped teeth for use in a tree stump grinding apparatus, and shaped carbide tips for such teeth.

BACKGROUND

In the discussion of the background that follows, reference is made to certain structures and/or methods. However, the following references should not be construed as an admission that these structures and/or methods constitute prior art. Applicant expressly reserves the right to demonstrate that such structures and/or methods do not qualify as prior art.

Conventional stump grinders are disclosed in U.S. Pat. Nos. 6,382,277 and 6,546,977, for example. Typically, the stump grinder includes a rotatable wheel or disk having a plurality of carbide-tipped teeth, including side cutting teeth projecting from the side surfaces of the disk and peripheral cutting teeth spaced about a circumferential outer surface of the disk. Each tooth includes a carbide cutting tip cemented or brazed to the a tooth body. A conventional cutting tip as used on each tooth includes a long flat cutting edge at the junction of its front and top faces. The tooth body includes a steel shaft for mounting the cutting tip to the disk, and the teeth are mounted so as to be inclined at various angles relative to the disk. In use, the disk is positioned in a generally vertical plane and rotationally driven about its centrally disposed horizontal axis, whereupon the cutting tips of the teeth contact and gradually disintegrate a stump.

As the stump grinding machine is operated, the carbide-tipped teeth cut through the wood fibers of tree stumps in the ground that are to be removed. The cutting action of the teeth through the earth and wood causes a great deal of wear on the tooth body, holders and steel disk. Often, long strings of chips are produced which makes cleanup afterward more difficult. When the conventional teeth are fastened to the sides of the cutter disk, the long flat top edge of the cemented carbide cutting tip must penetrate the hard stump. While the edge of the cutting tip remains sharp, this works well, but as the cutting edge becomes dull, the tip starts to "pound" the stump, tearing the wood apart in larger pieces. A dull cutting edge also requires increased horsepower and torque to drive the disk. Additionally, a blunt carbide cutting tip slows the cutting action and causes severe vibration throughout the grinding machine.

An exemplary stump grinding machine, the DURA Disk Cutting System utilizes flat radial cemented carbide-tipped teeth in which the cutting tips have a flat top, mounted on the edge of a steel disk using steel holders called pockets. The teeth lean alternately left and right of center on the disk, which allows the corners of the cemented carbide cutting tip, which are slightly rounded, to do the major portion of the cutting. However, since the face of the cutting tip is flat, the earth and wood cuttings travel down the face of the cutting tip and tooth to wear and erode the pockets and the disk.

SUMMARY

An exemplary embodiment of a carbide cutting tip for mounting on a tooth of a cutting tool includes a rear surface and a bottom surface for mounting the tip to a tooth, a top surface, and a front surface. The top surface has a pair of peaks separated by a trough, the top surface including a frontward facet and a rearward facet sloped downwardly and rearwardly at a non-zero angle $\alpha$ with respect to the frontward facet. The front surface has a substantially flat lower portion and a concave upper portion having a shape defined by a segment of an ellipse, the lower portion of the front surface being disposed substantially perpendicularly to the frontward facet of the top surface, the lower portion and the upper portion joining at a break point located at the apex of the major axis of the ellipse. The major axis of the ellipse is canted frontwardly from the break point at a non-zero angle $\beta$ with respect to the lower portion of the front surface.

Another exemplary embodiment of a carbide cutting tip for mounting on a tooth of a cutting tool includes a rear surface and a bottom surface for mounting the tip to a tooth, a top surface, a front surface, and side surfaces. The top surface has a pair of peaks separated by a trough, the top surface including a frontward facet and a rearward facet sloped downwardly and rearwardly at an angle $\alpha$ in the range of about 12° to about 18° with respect to the frontward facet. The front surface has a substantially flat lower portion and a concave upper portion having a shape defined by a segment of an ellipse, the lower portion of the front surface being disposed substantially perpendicularly to the frontward facet of the top surface, the lower portion and the upper portion joining at a break point located at the apex of the major axis of the ellipse, the major axis of the ellipse being canted frontwardly from the break point at an angle $\beta$ in the range of about 10° to about 12° with respect to the lower portion of the front surface. The side surfaces extend between the front surface and the rear surface, and between the top surface and the bottom surface, the side surfaces being tapered at a non-zero angle $\Phi$ such that the front surface has a width larger than the rear surface. The ratio of the length of the major axis of the ellipse to the length of the minor axis of the ellipse is in the range of about 4.0 to about 4.5. The apex of the minor axis of the ellipse is located within the concave portion of the front surface. Each of the two peaks and the trough is formed with a radius of curvature greater than about one-sixth of width of the front surface of the tip, the peaks and the trough forming a continuous waveform on the top surface.

An exemplary carbide-tipped tooth for mounting to a rotating disk of a cutting tool includes a tooth body and a cutting tip. The tooth body includes a head having a frontward and upward facing seat and a shank extending downward from the head, the shank having an axis. The cutting tip is mounted in the seat of the head and includes a top surface and a front surface. The top surface of the cutting tip has a pair of peaks separated by a trough, the top surface including a frontward facet and a rearward facet sloped downwardly and rearwardly at a non-zero angle $\alpha$ with respect to the frontward facet. The front surface of the cutting tip has a substantially flat lower portion and a concave upper portion having a shape defined by a segment of an ellipse, the lower portion of the front surface being disposed substantially perpendicularly to the frontward facet of the top surface. The lower portion and the upper portion join at a break point located at the apex of the major axis of the ellipse, the major axis of the ellipse being canted frontwardly from the break point at a non-zero angle $\beta$ with respect to the lower portion of the front surface. The lower portion of the front surface of the cutting tip is oriented at an angle of attack $\theta$ with respect to the axis of the shank.

An exemplary stump grinding disk includes a wheel defining an axis of rotation. The wheel includes a pair of side surfaces intersected by the axis of rotation and a circumferential outer surface joining the side surfaces, and a plurality of teeth mounted to one or more of the side surfaces and the circumferential outer surface of the wheel. Each tooth has a tooth body and a cutting tip. The tooth body includes a head having a frontward and upward facing seat and a shank extending downward from the head, the shank having an axis. The cutting tip is mounted in the seat of the head and includes a top surface and a front surface. The top surface of the cutting tip has a pair of peaks separated by a trough, the top surface including a frontward facet and a rearward facet sloped downwardly and rearwardly at a non-zero angle α with respect to the frontward facet. The front surface of the cutting tip has a substantially flat lower portion and a concave upper portion having a shape defined by a segment of an ellipse, the lower portion of the front surface being disposed substantially perpendicularly to the frontward facet of the top surface. The lower portion and the upper portion join at a break point located at the apex of the major axis of the ellipse, the major axis of the ellipse being canted frontwardly from the break point at a non-zero angle β with respect to the lower portion of the front surface. The lower portion of the front surface of the cutting tip is oriented at an angle of attack θ in the range of about 2.5° to about 7.5° with respect to the axis of the shank.

It is to be understood that both the foregoing general description and the following detailed description are exemplary and explanatory and are intended to provide further explanation of the invention as claimed.

BRIEF DESCRIPTION OF THE DRAWING

The following detailed description can be read in connection with the accompanying drawings in which like numerals designate like elements and in which.

DETAILED DESCRIPTION

Figure 3:
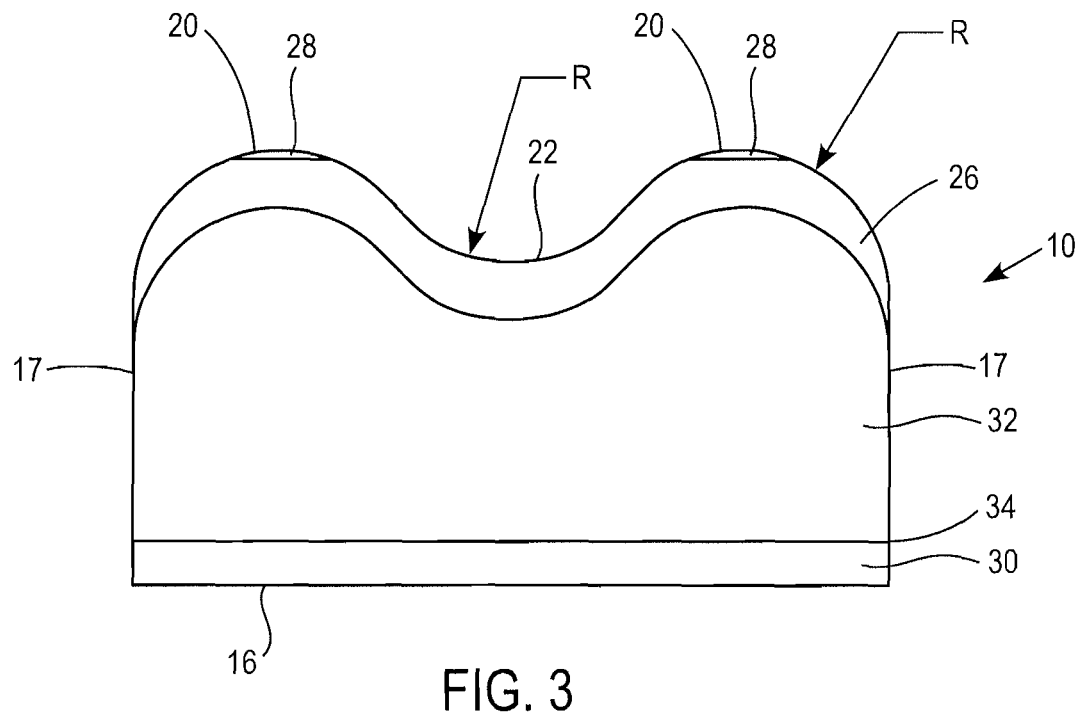
FIG. 3 is a front view of the cutting tip of FIG. 1.
Figure 4:
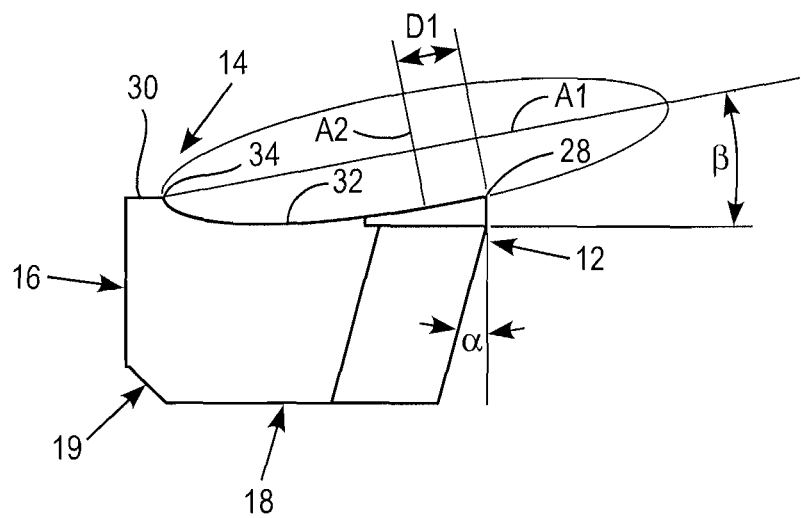
FIG. 4 is a side view of the cutting tip of FIG. 1.
Figure 5:
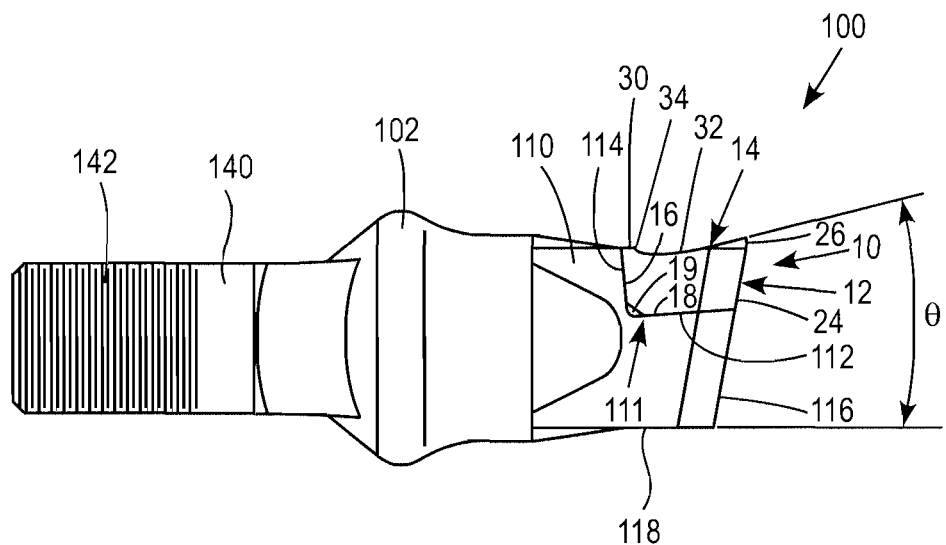
FIG. 5 is a side view of an exemplary carbide-tipped tooth for use on a grinding wheel.
Figure 6:
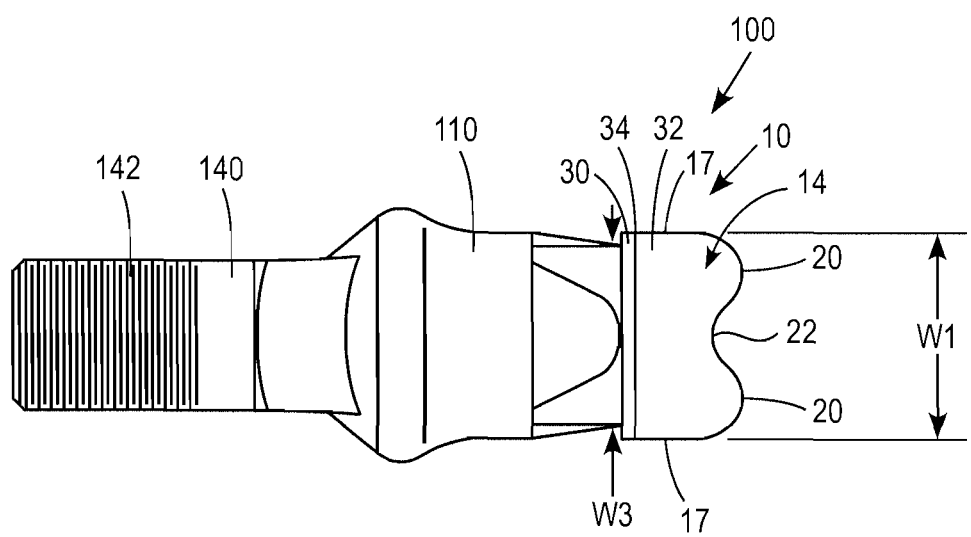
FIG. 6 is a front view of the carbide-tipped tooth of FIG. 5.
Figure 7:
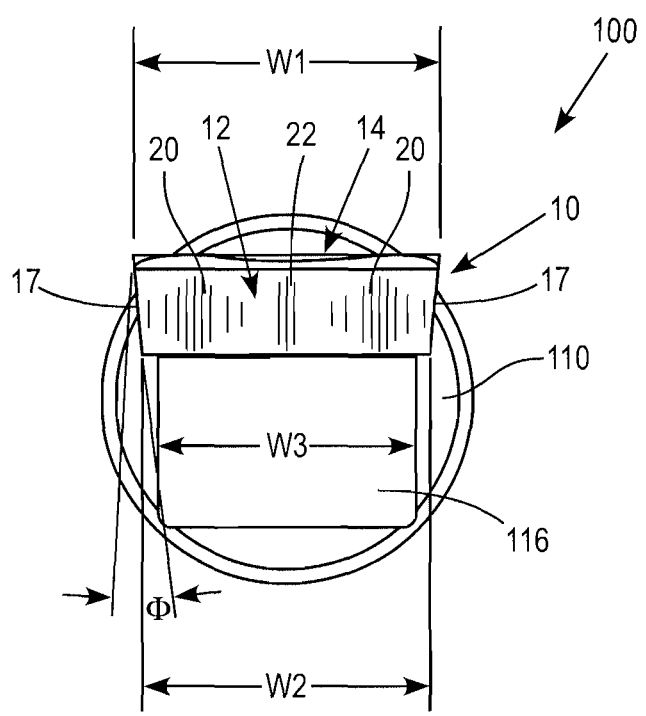
FIG. 7 is a top view of the carbide-tipped tooth of FIG. 5.

FIGS. 1-4 illustrate an embodiment of a carbide cutting tip 10 for mounting on a tooth of a grinding disk or wheel, and FIGS. 5-7 illustrate the cutting tip 10 mounted to a tooth body 102 to form a carbide-tipped tooth 100. A plurality of teeth 100 is shown mounted to a grinding disk in FIG. 8. For ease of description, the relative directional terms bottom, top, front, and rear are used to indicate various aspects of the cutting tip 10 and the tooth 100, it being understood that those directions are not absolute but are defined so as to designate the top as outward facing when the tooth is mounted to a grinding wheel and the front as forward facing in the direction of rotation of the grinding wheel.

As depicted, the cutting tip 10 includes a bottom surface 16 and a rear surface 18. The bottom surface 16 and the rear surface 18 of the cutting tip 10 are oriented generally perpendicularly to each other, although orientations of other angles close to perpendicular can be used. To enhance the ability to cement or braze the cutting tip 10 to a tooth body 102 to form the tooth 100, a notch 19 may be provided at the junction of the bottom surface 16 and the rear surface 18. The bottom surface 16 and the rear surface 18 are cemented or brazed to a top mounting surface 114 and a front mounting surface 112, respectively, of the tooth body 102.

The cutting tip 10 further includes a front surface 14 having a substantially flat lower portion 30 and a concave upper portion 32. The lower portion 30 and the upper portion 32 are joined at a junction or break line 34. The lower portion 30 is oriented generally perpendicularly to the bottom surface 16, and thus generally parallel to the rear surface 18.

A top surface 12 of the cutting tip 10 spans between the upper portion 32 of the front surface 14 and the rear surface 18. The top surface 12 includes a frontward facet 26 oriented substantially perpendicularly to the lower portion 30 of the front surface 14, and a rearward facet 24 that slopes downwardly from the frontward facet 26 toward the rear surface 18 at an angle α with respect to the frontward facet 26. The angle α can range from about 12° to about 18°, and is preferably about 15°. The frontward facet 26 joins the upper portion 32 of the front surface 14 at a cutting edge 25, which is preferably the first portion of the cutting tip 10 to contact a target material during a cutting or grinding operation.

Side surfaces 17 span between the front surface 14 and the rear surface 18, and between the top surface 12 and the bottom surface 16.

Figure 1:
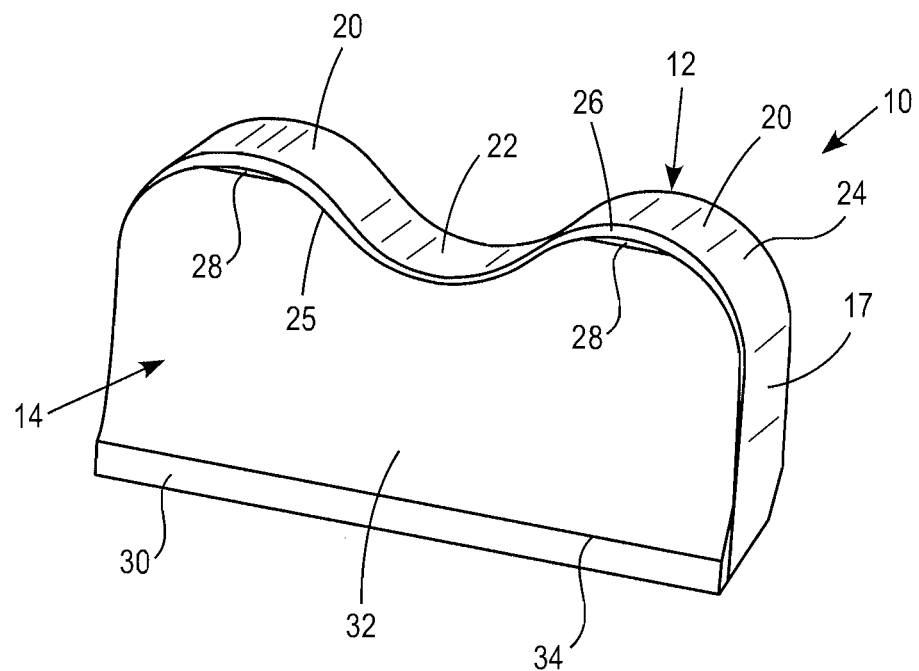
FIG. 1 is a perspective view of an exemplary carbide cutting tip for mounting on a tooth of a grinding wheel.
Figure 2:
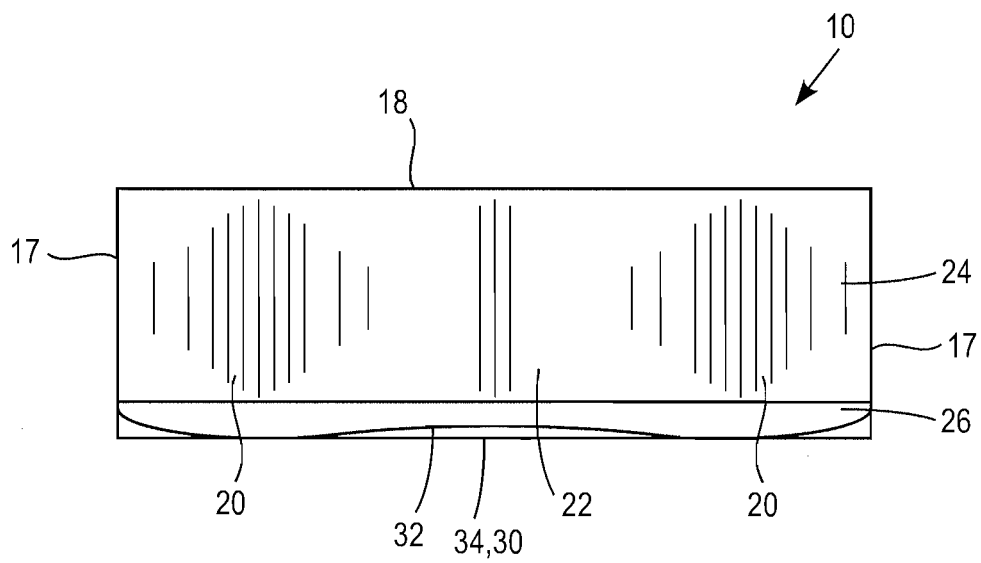
FIG. 2 is a top view of the cutting tip of FIG. 1.

As shown in FIGS. 1-3, the top surface 12 has a generally sinusoidal shape having a continuously changing slope that includes a pair of peaks 20 separated by a trough 22. In one embodiment, each of the peaks 20 and the trough 22 has a radius of curvature R. The radius of curvature R is equal to or greater than at least about one-sixth of a maximum width W1 of the cutting tip 10 so that the trough 22 and the peaks 22 meet at tangents of their respective circle segments. In a preferred embodiment, the radius of curvature R is equal to or slightly less than about one-fifth of the maximum width W1 of the cutting tip 10, which results in the top surface 14 at the trough 22 being lower than the top surface 14 at the peaks 20 by a distance equal to about three-quarters of the radius of curvature R. To increase the depth of the trough 22, the radius of curvature R can be decreased, and to decrease the depth of the trough 22, the radius of curvature R can be increased.

The configuration of the top surface 12, including the peaks 20 separated by the trough 22, enables smoother cutting of the cutting tip 10, particularly when teeth 100 containing the cutting tips 10 are mounted to lean alternately left and right of center on a grinding disk. Leaning the teeth 100 accentuates the peaks 20 and causes one peak 20 to contact the target material first, resulting in less dust and heat produced, less horsepower required, and less fuel consumed for the same cutting or grinding operation. A small chamfer 28 may be included between the frontward facet 26 of each peak 20 and the upper portion 32 of the front surface 14 to reduce the risk of chipping the cutting tip 10.

As can be seen particularly in the side view of FIG. 4, the curvature of the upper portion 32 of the front surface 14 is defined by an ellipse having a major axis A1 and a minor axis A2. The ratio of the length of the major axis A1 to the length of the minor axis A2 can be in the range of about 3 to about 6, preferably is in the range of about 4.0 to about 4.5, and more preferably is equal to about 4.3.

The ellipse is oriented in a plane perpendicular to a plane containing the lower portion 30 of the front surface 14, so that the concave upper portion 32 of the front surface 14 has a uniform curvature across the front surface 14 in a transverse or side-to-side direction. The major axis A1 of the ellipse is oriented at an angle β with respect to the lower portion 30 of the front surface 14, and the junction 34 between the lower portion 30 and the upper portion 32 is located at an apex of the major axis A1. The angle β can range from about 8° to about 14°, preferably from about 10° to about 12°, and most preferably is equal to about 11°.

As depicted, the apex of the minor axis A2 is located within the upper portion 32 of the front surface 34 at a distance D1 from the cutting edge 25 at each of the peaks 20. The distance D1 can range from about 0% to about 20% of the length of the major axis A1, so that the front surface 14 has a relatively flat curvature near the cutting edge 25. In one embodiment, the distance D1 is about 12% of the length of the major axis A1.

The elliptical shape of the upper portion 32 of the front surface 14 of the cutting tip 10 helps to curl and break the wood fibers of the wood being cut from the target material. Curling and breaking the wood fibers in turn pushes the wood, as well as earth surrounding the wood that is churned up by the tooth, away from the tooth holders and the disk, which minimizes the wear and erosion on these supporting parts. Because of the orientation of the ellipse, the elliptical surface of the upper portion 32 of the front surface 14 has a radius that continuously decreases from the top toward the bottom of the upper portion 32. Consequently, the front surface 14 becomes more sharply curved as the wood fibers move down the front surface 14 from the cutting edge 25 toward the lower portion 30 of the front surface. This tightening of the radius of curvature of the front surface 14 causes the wood chips to accelerate and be forced outward in frontward and sideways directions form the front surface 14 and thus away from the grinding disk, protecting the disk from the abrasive cuttings.

In addition, the elliptically-shaped upper portion 32 of the front surface 14 of the cutting tip 10 produces much smaller pieces of wood fibers through out the life of the cutting tip 10 as compared with conventional flat faced designs. Even as the cutting edge 25 of the cutting tip 10 begins to dull and blunt, the smaller area of contact created by the peaks 20 separated by the trough 22 produces smaller wood chips and minimizes or eliminates vibration to the grinding machine. Also, because there is a smaller contact area between the cutting tip 10 and the target material, the power requirements of the grinding machine are reduced.

Further, the elliptical surface of the upper portion 32 of the front surface 14 acts as a chip breaker. Smaller chips are more desirable to facilitate cleanup and can more readily be used to back fill a hole after a stump is cut. Also, smaller chips accelerate decomposition of the wood fibers, and as a result growing grass in the chips is faster and easier.

As shown in FIGS. 5-7, the cutting tip 10 is mounted to a tooth body 102 to form a tooth 100. The tooth body 102 includes a head 110 for receiving the cutting tip 10 and a shank 140 extending downwardly from the head 110. The shank has an axis extending in a top to bottom direction. The head 110 has a width W3. In one embodiment, the shank 140 includes threads for mounting the tooth 100 to a grinding disk. The head 110 includes a rear surface 118, a top surface 116 oriented at an obtuse angle with respect to the rear surface 118, and a seat 111 for receiving the cutting tip 10. The seat 111 includes a front mounting surface 112 for mating with the rear surface 18 of the cutting tip 10 and a top mounting surface 114 for mating with the bottom surface 16 of the cutting tip 10.

The cutting tip 10 is mounted to the tooth body 102 so that the cutting edge 25 will have an angle of attack into a target material being ground or cut. The angle of attack is defined by an angle θ between the lower portion 30 of the front surface 14 of the cutting tip 10 and the axis of the shank 140 of the tooth body 102. Note, however, that the actual angle of attack of the cutting edge 25 may differ from the angle θ due to the elliptical shape of the upper portion 32 of the front surface 14 of the cutting tip 10, as well as variation in location of the junction between the sinusoidal top surface 12 and the elliptical upper portion 32 across the front surface 14 of the cutting tip 10. The angle θ can be in the range of about 2.5° to about 7.5° and is preferably about 5°.

As can best be seen in FIGS. 6 and 7, both the maximum width W1, measured at the widest point of the cutting tip 10, and a minimum width W2, measured at the narrowest point of the cutting tip 10, may be equal to or greater than the width W3 of the tooth body 102 to which the cutting tip 10 is mounted. In addition, in the depicted embodiment, the side surfaces 17 of the cutting tip 10 taper slightly, at an angle Φ to narrow from the front surface 14, having a width W1, to the rear surface 18, having a width W2. Tapering the side surfaces 17 of the cutting tip 10 reduces abrasive wear on the side surfaces 17. The angle Φ can range from about 3° top about 15°, preferably from about 5° to about 10°, and in one embodiment is about 5°.

In one particular embodiment, the cutting tip 10 has a maximum width W1 of between about 21.8 mm and about 22.4 mm, and is preferably about 22.1 mm. The cutting tip 10 has a depth of about 7.3 mm. The maximum height of the cutting tip 10, measured from the bottom surface 16 to the frontward facet 26 of the top surface 14, is between about 12.4 mm and about 13.0 mm, and is preferably about 12.7 mm. The radius of curvature R of the peaks 20 and the trough 22 is about 4.27 mm. The lower portion 30 of the front surface 14 extends upward from the bottom surface 16 by about 1.3 mm. The major axis A1 of the ellipse defining the concave upper portion 32 of the front surface 14 is about 18.1 mm and the minor axis A2 of the ellipse is about 4.2 mm, so that the ratio is about 4.3. The apex of the major axis A1 is located at the junction 34 between the lower portion 30 and the upper portion 32 of the front surface 14. The minor axis A2 is located in the upper portion 32 of the front surface 14 at about 2.2 mm from the cutting edge 25 at each peak 20. The major axis A1 of the ellipse is oriented an angle between about 10° and about 12° with respect to the lower portion 30 of the front surface 14, and preferably at an angle of about 11°. The top surface 12 slopes rearwardly downward from the front surface 14 to the rear surface 18 at an angle of about 15°. The side surfaces 17 of the cutting tip 10 taper at an angle of about 5° so that the cutting tip 10 is narrower at the rear surface 18 than at the front surface 14. When mounted in a tooth body 102, the angle of attack, defined by the orientation of the lower portion 30 of the front surface 14 with respect to the axis of the shank 140, is equal to about 5°.

Figure 8:
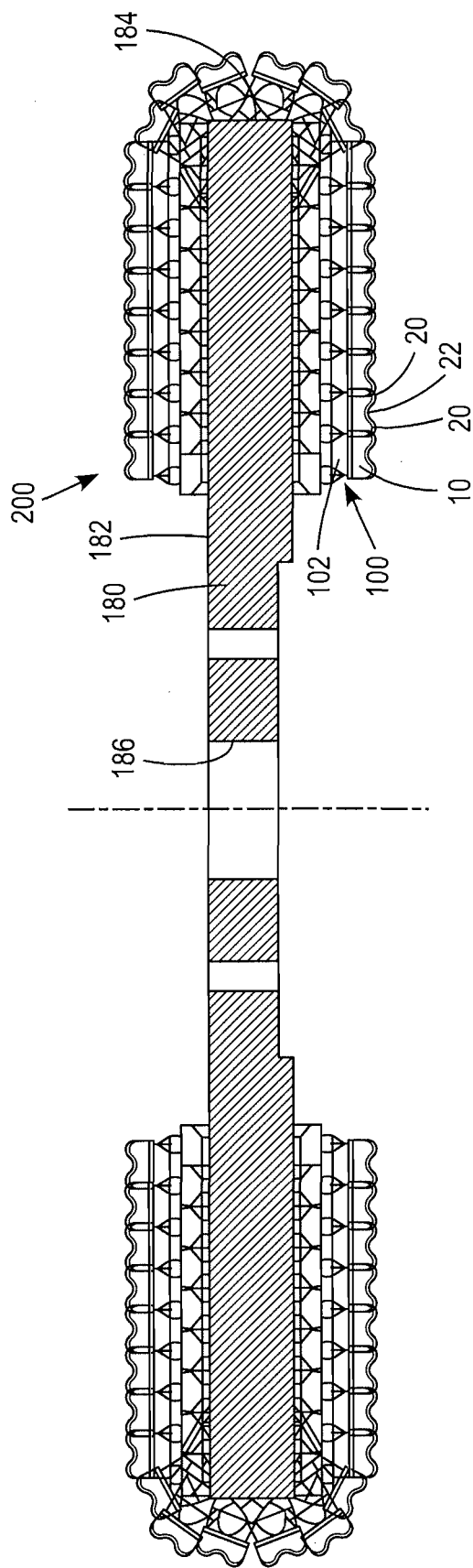
FIG. 8 is a cross-sectional view of an exemplary grinding disk including teeth each having a carbide cutting tip as disclosed herein.

As shown in FIG. 8, a plurality of teeth 100 can be mounted to side surface 182 and a radially outward surface 184 of a steel disk 180 having a central bore 186 therethrough to form a grinding disk 200. The disk 200 can then be rotatably mounted onto a grinding machine so as to rotate about the central bore 186. When the grinding disk 200 is rotated and advanced horizontally toward a stump, the carbide-tipped teeth 100 will cut a swath through the stump, and then by advancing and retracting the disk 200 while moving the disk 200 gradually to one side or the other, the teeth will disintegrated the stump on both sides of the original swath.

Although described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. A carbide cutting tip for mounting on a tooth of a cutting tool, the tip comprising:

a rear surface and a bottom surface for mounting the tip to a tooth;

a top surface having a pair of peaks separated by a trough, the top surface including a frontward facet and a rearward facet sloped downwardly and rearwardly at a non-zero angle α with respect to the frontward facet; and a front surface having a substantially flat lower portion and a concave upper portion having a shape defined by a segment of an ellipse, the lower portion of the front surface being disposed substantially perpendicularly to the frontward facet of the top surface, the lower portion and the upper portion joining at a break point located at the apex of the major axis of the ellipse, the major axis of the ellipse being canted frontwardly from the break point at a non-zero angle β with respect to the lower portion of the front surface, wherein the top surface and the front surface join to form a cutting edge.

2. The cutting tip of claim 1, wherein the angle β is in the range of about 10° to about 12°.

3. The cutting tip of claim 2, wherein the angle β is about 11°.

4. The cutting tip of claim 1, wherein the angle α is in the range of about 12° to about 18°.

5. The cutting tip of claim 4, wherein the angle α is about 15°.

6. The cutting tip of claim 1, further comprising a chamfered surface at a junction between the frontward facet of each peak of the top surface and the upper portion of the front surface.

7. The cutting tip of claim 1, further comprising side surfaces extending between the front surface and the rear surface, and between the top surface and the bottom surface, the side surfaces being tapered at a non-zero angle Φ such that the front surface has a width larger than the rear surface.

8. The cutting tip of claim 1, wherein the ratio of the length of the major axis of the ellipse to the length of the minor axis of the ellipse is in the range of about 3 to about 6.

9. The cutting tip of claim 8, wherein the ratio of the length of the major axis of the ellipse to the length of the minor axis of the ellipse is about 4.3.

10. The cutting tip of claim 1, wherein the apex of the minor axis of the ellipse is located within the concave portion of the front surface.

11. The cutting tip of claim 10, wherein the apex of the minor axis of the ellipse is located less than or equal to about 20% of the length of the major axis from the cutting edge measured at the peaks of the top surface.

12. The cutting tip of claim 1, wherein each of the two peaks and the trough are formed with a radius of curvature greater than about one-sixth of a lateral width of the tip, the peaks and the trough forming a continuous waveform on the top surface.

13. The cutting tip of claim 12, wherein each of the two peaks and the trough is formed with a radius of curvature equal to about one-fifth of the lateral width of the tip.

14. A carbide-tipped tooth for mounting to a rotating disk of a cutting tool, the tooth comprising:

a tooth body including
a head having a frontward and upward facing seat, and
a shank extending downward from the head, the shank having an axis;
a cutting tip mounted in the seat of the head, the cutting tip including:
a top surface having a pair of peaks separated by a trough, the top surface including a frontward facet and a rearward facet sloped downwardly and rearwardly at a non-zero angle α with respect to the frontward facet, and
a front surface having a substantially flat lower portion and a concave upper portion having a shape defined by a segment of an ellipse, the lower portion of the front surface being disposed substantially perpendicularly to the frontward facet of the top surface, the lower portion and the upper portion joining at a break point located at the apex of the major axis of the ellipse, the major axis of the ellipse being canted frontwardly from the break point at a non-zero angle β with respect to the lower portion of the front surface, wherein the lower portion of the front surface of the cutting tip is oriented at an angle of attack θ with respect to the axis of the shank.

15. The tooth of claim 14, wherein the angle of attack θ is in the range of about 2.5° to about 7.5°.

16. The tooth of claim 15, wherein the angle of attack θ is about 5°.

17. The tooth of claim 14, wherein the angle β is in the range of about 10° to about 12°.

18. The tooth of claim 14, wherein the angle α is in the range of about 12° to about 18°.

19. The tooth of claim 14, wherein the ratio of the length of the major axis of the ellipse to the length of the minor axis of the ellipse ranges from 4.0 to about 4.5; and wherein the apex of the minor axis of the ellipse is located within the concave portion of the front surface.

20. The tooth of claim 14, wherein each of the two peaks and the trough is formed with a radius of curvature greater than about one-sixth of a lateral width of the tip, the peaks and the trough forming a continuous waveform on the top surface.

21. A stump grinding disk comprising:

a wheel defining an axis of rotation and including a pair of side surfaces intersected by the axis of rotation and a circumferential outer surface joining the side surfaces; and a plurality of teeth mounted to one or both of the side surfaces and the circumferential outer surface of the wheel, wherein each tooth comprises:
a tooth body including:
a head having a frontward and upward facing seat; and
a shank extending downward from the head, the shank having an axis; and
a cutting tip mounted in the seat of the head,
wherein the cutting tip includes:
a top surface having a pair of peaks separated by a trough, the top surface including a frontward facet and a rearward facet sloped downwardly and rearwardly at a non-zero angle α with respect to the frontward facet; and
a front surface having a substantially flat lower portion and a concave upper portion having a shape defined by a segment of an ellipse, the lower portion of the front surface being disposed substantially perpendicularly to the frontward facet of the top surface, the lower portion and the upper portion joining at a break point located at the apex of the major axis of the ellipse, the major axis of the ellipse being canted frontwardly from the break point at a non-zero angle β with respect to the lower portion of the front surface, wherein the lower portion of the front surface of the cutting tip is oriented at an angle of attack θ in the range of about 2.5° to about 7.5° with respect to the axis of the shank.

22. The stump grinding disk of claim 21, wherein the angle β in the range of about 10° to about 12°.

23. The stump grinding disk of claim 21, wherein the angle α in the range of about 12° to about 18°.

24. The stump grinding disk of claim 21, wherein the ratio of the length of the major axis of the ellipse to the length of the minor axis of the ellipse is in the range of about 4.0 to about 4.5; and wherein the apex of the minor axis of the ellipse is located within the concave portion of the front surface.

25. The stump grinding disk of claim 21, wherein each of the two peaks and the trough is formed with a radius of curvature greater than about one-sixth of a lateral width of the tip, the peaks and the trough forming a continuous waveform on the top surface.

26. A carbide cutting tip for mounting on a tooth of a cutting tool, the tip comprising:
- a rear surface and a bottom surface for mounting the tip to a tooth;
- a top surface having a pair of peaks separated by a trough, the top surface including a frontward facet and a rearward facet sloped downwardly and rearwardly at an angle α in the range of about 12° to about 18° with respect to the frontward facet;
- a front surface having a substantially flat lower portion and a concave upper portion having a shape defined by a segment of an ellipse, the lower portion of the front surface being disposed substantially perpendicularly to the frontward facet of the top surface, the lower portion and the upper portion joining at a break point located at the apex of the major axis of the ellipse, the major axis of the ellipse being canted frontwardly from the break point at an angle β in the range of about 10° to about 12° with respect to the lower portion of the front surface; and
- side surfaces extending between the front surface and the rear surface, and between the top surface and the bottom surface, the side surfaces being tapered at a non-zero angle Φ such that the front surface has a width larger than the rear surface;

wherein the ratio of the length of the major axis of the ellipse to the length of the minor axis of the ellipse in the range of about 4.0 to about 4.5, wherein the apex of the minor axis of the ellipse is located within the concave portion of the front surface, and wherein each of the two peaks and the trough is formed with a radius of curvature greater than about one-sixth of a lateral width of the tip, the peaks and the trough forming a continuous waveform on the top surface.

\* \* \* \* \*